C. I. HALL.
PROCESS OF MAKING COMPOSITE BIMETALLIC ARTICLES.
APPLICATION FILED AUG. 21, 1916.

1,250,862.

Patented Dec. 18, 1917.

Fig. 1.

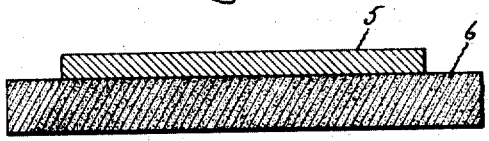

Fig. 4.

Strip of metal of low coefficient of expansion placed on non-heat conducting base.

Fig. 2.

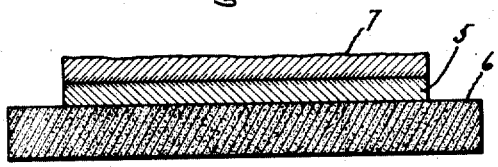

Layer of metal of high coefficient of expansion melted on strips by oxy-acetylene flame.

Fig. 3.

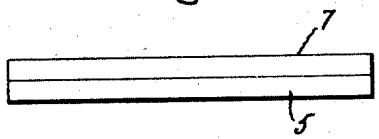

Resulting bi-metallic article machined to desired thickness.

Inventor:
Chester I. Hall,
by *Albert G. Davis*
His Attorney.

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

PROCESS OF MAKING COMPOSITE BIMETALLIC ARTICLES.

1,250,862.  Specification of Letters Patent.  Patented Dec. 18, 1917.

Application filed August 21, 1916.  Serial No. 115,978.

*To all whom it may concern:*

Be it known that I, CHESTER I. HALL, a citizen of the United States, residing at Fort Wayne, in the county of Allen, State of Indiana, have invented certain new and useful Improvements in Processes of Making Composite Bimetallic Articles, of which the following is a specification.

My invention relates to a process of making composite bi-metallic articles and in particular to a process of uniting two dissimilar metal bodies having relatively different coefficients of expansion. Specifically, the invention relates to a process for the manufacture of thermostatic metal.

Thermostatic metal, as known in the art, is a composite bi-metallic article made up of two metals of relatively different coefficients of expansion. In its best known form thermostatic metal consists of strips or bars of two dissimilar metals having different coefficients of expansion securely united to form mechanically a single metallic strip or bar. The union of the two dissimilar metals must be very firm to withstand the strains occasioned by the bending or warping of the composite metal article when subjected to changes in temperature. As far as I am aware, it has heretofore been generally customary to unite the two dissimilar metals by soldering or brazing, and considerable difficulty has been experienced in uniting the two metals so they would not separate or tear apart at their junction. The particular object of my present invention is to provide an improved process for the manufacture of thermostatic metal, and in general to provide an improved process for uniting two dissimilar metals, and in particular two dissimilar metals having different melting point and different coefficients of expansion. In carrying out the invention, I heat small areas of the surface of one metal and melt onto such heated areas a suitable quantity of the other metal, preferably by means of an oxy-acetylene flame, and progressively extend this treatment of small areas until the surface of the first metal has received a suitable layer of the second metal.

The novel features of the invention which I believe to be patentable are definitely indicated in the claims appended hereto. The invention itself will be best understood from the following description taken in conjunction with the accompanying drawing, in which:

Figures 1, 2 and 3 diagrammatically represent the principal steps in my improved process of making composite bi-metallic articles; and Fig. 4 is a tabulated outline of the process.

The most sensitve thermostatic metal is obviously obtained by employing two dissimilar metals or alloys whose relative difference of coefficient of expansion is the greatest. Practically, the use of a special nickel-steel alloy having a relatively low coefficient of expansion and of a leaded-brass having a relatively high coefficient of expansion has been found very satisfactory. I prefer to use the special nickel-steel alloy known as invar whose composition is substantially as follows.

Nickel ------------------ 35.5 %
Carbon ------------------ .18%
Manganese --------------- .42%

The remainder being pure iron.

Invar has an extremely low coefficient of expansion, and when a strip or sheet of this metal is united with a strip or sheet of brass, the difference in the expansion and contraction of the invar and brass causes the composite strip or sheet to curl under temperature changes, thus providing a temperature responsive or thermostatic member. In order that constant and continuous performance may be obtained from this composite bi-metallic member, it is necessary that the two dissimilar metals of which it is composed be as perfectly united as possible, and the particular aim of the present invention is to provide a process for uniting invar and brass to produce a satisfactory thermostatic metal.

In carrying out the invention, as digrammatically represented in Fig. 1, a sheet or strip of invar 5 of suitable dimensions is placed on a flat base 6 of any non-heat conducting material, such, for example, as a sheet of asbestos. The invar sheet or strip is approximately of the thickness desired in the finished bi-metallic article. Starting at any desired place on the upper surface of the invar sheet, the surface over a small area is brought to a fusing temperature, and while in this state brass is melted onto the fused area. This fusing and melting operation is best carried out with an oxy-acetylene flame. Thus, a small area of the upper surface of the invar is brought to a fusing temperature by the oxy-acetylene flame, and brass is melted onto this fused area, also by means of the oxy-acetylene flame. This fusing and melting operation over small areas is progressively extended until the whole upper surface of the invar sheet has received a layer of brass of the desired thickness. This layer of brass is represented in Fig. 2 of the drawing by reference numeral 7. It will of course be understood that a suitable fluxing agent, such, for example, as powdered borax, may be sprinkled over the surface of the invar and fused or melted before the brass is melted thereon.

A perfectly welded union between the brass and invar is obtained by fusing at one time only a relatively small area of the upper surface of the invar sheet. By means of the oxy-acetylene flame small areas can be very conveniently worked at a time. Thus, as small an area as can be conveniently and satisfactorily worked is fused and a layer of brass melted thereon, whereby the whole of this small area under treatment can be easily heated to a uniform fused state and a perfect weld obtained between the fused invar and the melted brass.

The fused invar and melted brass alloy to a certain extent, which further insures a perfect union between the two dissimilar metals. It will be evident that the brass is actually welded to the invar without the use of a third metal, with the result that it is practically impossible to separate the two metal strips, except by melting. Photomicrographs of composite bi-metallic articles produced by the process of my invention show no definite line of demarcation between the invar and brass, indicating that at their junction the brass is alloyed with the invar, whereas in the case of every other thermostatic metal with which I am acquainted, photomicrographs show a very definite line of demarcation between the two dissimilar metals.

The external or upper surface of the layer of brass is irregular and rough after the fusing and melting operation just described. This rough upper surface of the brass is indicated in Fig. 2 of the drawing. This rough surface is, accordingly, machined in any suitable manner in order to obtain a smooth flat surface, and, further, in order to reduce the thickness of the brass layer to the desired value. It will thus be understood that the thickness of the layer of brass melted on the invar sheet is slightly greater than the desired thickness of the brass in the finished bi-metallic article. If desired the machined bi-metallic article may be slightly rolled in order to increase the hardness of the brass. In this connection, it should be noted that a leaded-brass, such as I prefer to employ, is liable to crack when rolled. A lead-free brass can be much more easily rolled than a leaded-brass, and hence where it is desirable or necessary to roll the bi-metallic article a lead-free brass should be employed. A leaded-brass has a higher coefficient of expansion than a lead-free brass, and for this reason I prefer to employ leaded-brass wherever possible.

What I claim as new and desire to secure by Letters Patent of the United States is:—

1. The process of making a bi-metallic article which comprises the steps of first locally heating a small area of the surface of a sheet of a metal until the surface of this small area becomes fused, and next melting onto this small area while the surface thereof is still in a fused state a layer of a second metal, and progressively extending these locally heating and melting operations over the surface of said sheet of metal.

2. The process of making thermostatic metal which comprises the steps of first fusing a small area of the surface of a sheet of a metal having low coefficient of expansion, and next melting onto this small area while the surface thereof is still in a fused state a layer of a second metal of relatively high coefficient of expansion, and progressively extending these fusing and melting operations over the surface of said sheet of metal until a substantially uniform layer of the second metal has been thus united with said sheet.

3. The process of making thermostatic metal which comprises the steps of first fusing a small area of the surface of a sheet of nickel-steel alloy of low coefficient of expansion, and next melting onto this small area while the surface thereof is still in a fused state a layer of brass of relatively high coefficient of expansion, and progressively extending these fusing and melting operations over the surface of said nickel-steel sheet.

4. The process of making a bi-metallic article which comprises the steps of first locally heating by an oxy-acetylene flame a small area of the surface of a sheet of a metal until the surface of this small area becomes fused, and next melting by the oxy-acetylene flame a second metal of considerably greater electrical conductivity than the first metal and allowing the melted metal to flow onto the small fused area of the first metal while the surface thereof is still in a fused state, and progressively extending these locally heating and melting operations over the surface of said sheet of metal.

In witness whereof, I have hereunto set my hand this 17th day of August, 1916.

CHESTER I. HALL.